Dec. 8, 1953     A. THOMASSEN     2,661,635
SAW FILING DEVICE

Filed Sept. 19, 1951     3 Sheets-Sheet 1

INVENTOR.
Anker Thomassen
BY
Donald F. McCarthy
ATTORNEY.

Dec. 8, 1953 A. THOMASSEN 2,661,635
SAW FILING DEVICE
Filed Sept. 19, 1951 3 Sheets-Sheet 2

INVENTOR.
Anker Thomassen
BY
ATTORNEY.

Dec. 8, 1953  A. THOMASSEN  2,661,635
SAW FILING DEVICE

Filed Sept. 19, 1951  3 Sheets-Sheet 3

INVENTOR.
Anker Thomassen
BY
Donald F. McCarthy
ATTORNEY.

Patented Dec. 8, 1953

2,661,635

UNITED STATES PATENT OFFICE 2,661,635

SAW FILING DEVICE

Anker Thomassen, Brooklyn, N. Y.

Application September 19, 1951, Serial No. 247,291

2 Claims. (Cl. 76—31)

The present invention relates to a saw sharpening device and more particularly to a manually operated sharpening device which is relatively simple in construction and operation and which is adaptable for use with a variety of different types of saws.

The primary object of the invention is the provision of a device for sharpening and truing the teeth of a saw and for accomplishing this result in a more efficient manner than has heretofore been possible with known arrangements of a similar nature.

The device of the present invention is designed for easy portability and simplicity of operation which permits even unskilled persons to perform accurate sharpening operations such as have heretofore been possible only by means of expensive and complex mechanisms. The conventional manner in which hand saws are sharpened by the average workman or amateur craftsman involves filing alternate teeth from one side of the saw and then reversing the operation for the remaining teeth from the opposite side of the saw. Accuracy of tooth pitch, spacing and bevel is dependent largely on the individual skill of the operator and is for the most part non-uniform even for the very small percentage of persons skilled in this type of work.

The sharpening device of the present invention provides a combination of easily adjustable means for controlling the pitch, spacing and bevel of saw teeth during the sharpening operation, and, in addition, eliminates the possibility of error resulting from the human element in conventional sharpening procedures. The device can be employed with favorable results by one entirely unskilled in this type of work.

To this end the invention involves a unitary structure comprising a plurality of sharpening members adjustably positioned adjacent to a work holder and a centrally disposed reciprocating drive gear mechanically linked to the sharpening members for alternately driving these members into engagement with a saw positioned in the work holder.

A feature of the present invention resides in the novel arrangement of a pair of adjustably positionable sharpening members which permits them to be preset to engage successively alternate grooves of a saw at angles corresponding respectively to the bevel of the saw teeth defining the grooves, whereby all of the teeth may be sharpened from one side of the saw for a single setting of the device.

A further feature of the present invention resides in the adjustability of the sharpening members to permit adjustment of the cutting faces thereof to correspond to the slope of different types of saw teeth.

The principal features and objects of the invention and the manner of attaining them will become more apparent and the invention itself will be best understood, by reference to the following description of the invention taken in conjunction with the accompanying drawings, wherein.

Figure 1:
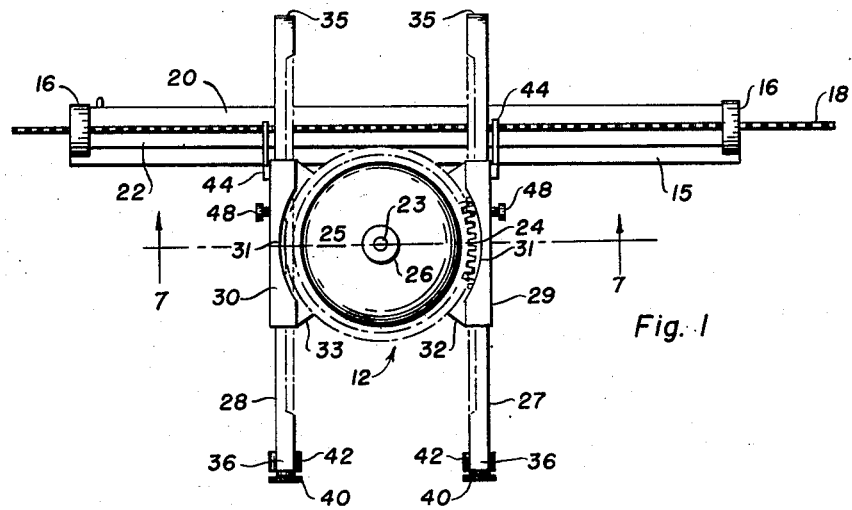
Figure 1 is a plan view of the saw sharpening device in a normal position.
Figure 2:
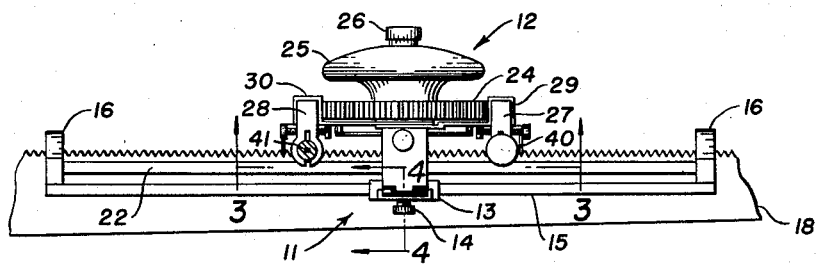
Figure 2 is a front view of the sharpening device as shown in Figure 1.
Figure 5:
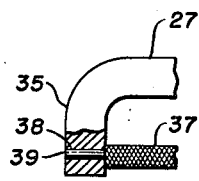
Figure 6:
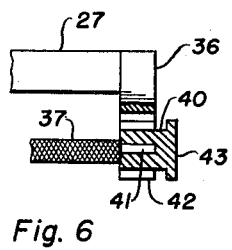
Figure 7:
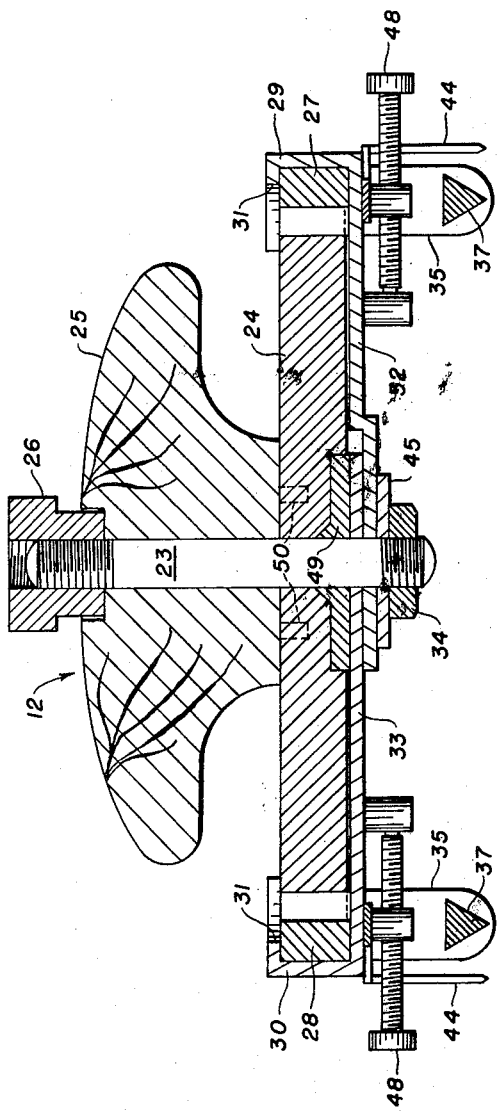

Figures 5 and 6 are detailed sectional views of a sharpening member, taken along the lines 5—5 and 6—6, respectively, of Figure 2, and Fig. 7 is a sectional front view taken along the line 7—7 of Fig. 1, showing the constructional details of the drive mechanism as employed in the device of the present invention.

Figure 4:
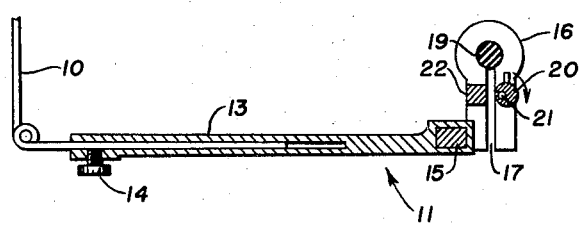
Figure 4 is a sectional view of the device taken along the line 4—4 of Figure 2 showing the work holder.

As best seen with reference to Figures 1, 2 and 4, the sharpening device of the present invention comprises a strap hinge 10 having a work holder 11 secured to one arm thereof and a sharpening assembly 12 secured to the other arm thereof.

The work holder 11 comprises an extension piece 13 adjustably positioned, preferably by means of a set screw 14, to the strap hinge 10. The extension piece 13 is in turn movably mounted on a guide bar 15 for movement along the bar. The guide bar 15 carries a substantially horseshoe-shaped member 16 at each end thereof. The members 16 are each provided with a slot 17 for receiving the saw which has been indicated by reference numeral 18 in Figures 1 and 2. In order to avoid damaging the teeth of the saw when it is placed in the slots 17, the members 16 are each fitted with suitable stop pieces 19 of rubber, wood or similar soft material.

To secure the saw in the slots 17, the work holder is provided with a cylindrical clamping bar 20. The clamping bar 20 extends between the members 16 and is eccentrically pivoted to one extension of the members defining the slots 17, by means of pivot pins 21. Also extending between the members 16 and securely fixed to the opposite extensions defining the slots 17 is a bar 22 which completes the work holder. When the saw is placed in the slots 17 with its teeth abutting the stop pieces 19, it is securely clamped against the bar 22 by pivoting the eccentric clamping bar 20 in a direction as indicated by the arrow in Figure 4. For obvious reasons the clamping bar 20 should be made of rubber, wood or similar material having a relatively large coefficient of friction.

As previously stated, the sharpening assembly 12 of the present invention, is mounted on one arm of strap hinge 10 and may be moved relative to the work holder 11 by means of a movable mounting of extension piece 13 on guide bar 15.

As best seen by reference to Fig. 7, the sharpening assembly comprises a central axle 23 extending from one arm of strap hinge 10 and provided with a press-fitted, conical bearing and washer member 49. A drive gear 24 is rotatably mounted on axle 23 with its undersurface recessed for engagement with the bearing surface of member 49. A drive handle 25 is in turn secured by means of a stop nut 26 to drive gear 24 in such manner as to provide for rotation of the gear in either direction on axle 23 in response to a similar rotation of handle 25. As shown in Fig. 7 in dotted lines, handle 25 may be keyed or pinned to gear 24 by means of pins 50 in order to lock these members together for rotation as a unit or alternatively the gear and drive handle therefor may be formed as a single unit.

Again with reference to Fig. 7, drive gear 24 is adapted to mesh with a pair of racks 27 and 28 which are disposed on either side of the gear and which are in turn positioned to slide within brackets 29 and 30, respectively. As best seen by reference to Figs. 1 and 3, brackets 29 and 30 are partially cut away as indicated at 31, to permit meshing of the rack teeth with gear 24. The brackets 29 and 30 are attached to a pair of supporting plates 32 and 33, respectively, which are mounted on the axle 23. Supporting plate 33 is mounted on axle 23 in contact with the washer surface of member 49 and plate 32 is recessed to fit over plate 33 as shown in Fig. 7. For convenience, brackets 29 and 30 and their respective supporting plates 32 and 33 may be formed as an integral unit by forging the outer edges of the supporting plates into channels suitable for receiving racks 27 and 28. Such a construction has been shown in the drawing, although it should be understood that closer tolerances could be achieved by forming the brackets separately and attaching them to their respective supporting plates. Supporting plates 32 and 33 may be adjustably positioned about the axle by means of a stop nut 34 threaded onto the lower end of the axle over that portion of hinge 10 which is designated by reference numeral 45 in the drawings.

With particular reference to Figures 5 and 6, it may be seen that the racks 27 and 28 are provided with extended end portions 35 and 36 respectively, which define a suitable frame for supporting the sharpening members 37. For purposes of illustration, the sharpening members have been shown as conventional three-cornered files but it should be understood that any suitable abrasive device may be substituted in place of the files, and, in fact, would be desirable in order to take full advantage of the two directional sharpening action possible in accordance with the device of the present invention, as will appear more clearly from the description which follows.

Most hand saws available today are designed with a different angular slope on the front and rear faces of each tooth and the particular angles employed vary in accordance with the type of saw. Therefore, it is important that a sharpening device of general utility should be capable of adjustment such that the cutting face of the sharpening member may be inclined to correspond to the slope of the saw teeth.

In accordance with the present invention, I provide for adjustment of the cutting faces of the files 37 by a novel method of mounting the files within their respective frames. The extended portions 35 of the identical racks 27 and 28 are provided with holes 38 adapted to receive a reduced portion 39 formed on one end of the file. The portion 39 of the file fits relatively loosely within the hole 38 thereby permitting pivotal movement of the file. The opposite end of the file is securely fixed within a friction bushing 40 by means of a similar reduced portion 41 on the file. The friction bushing 40, which may be formed of brass or micarta, is positioned within a clamp 42 formed on the extension 36 of the racks 27 and 28. The bushing 40 is fitted relatively tightly within the clamp 42 but may be turned therein by means of a knurled knob 43 formed on an extended portion of the bushing 40. By mounting the sharpening members in the manner indicated, they may be rotated to adjust the cutting face to correspond to the angular slopes of different types of saw teeth. In addition, when three-cornered or conventional flat two-faced files are used as the sharpening members, the adjustment permits the use of alternate working surfaces of the files, thereby insuring even wear of the files.

In view of the fact that the teeth of a saw are beveled alternately at opposite angles, in using the device of the present invention the two sharpening members are separately adjusted with respect to the saw in the work holder, such that each member is positioned, respectively, to contact those grooves in the saw which are defined by alternate pairs of adjacent saw teeth which are beveled in a same direction. Thus, one sharpening member is preset to engage all similar grooves in the saw defined by those teeth beveled in one direction while the other sharpening member is preset to engage all similar alternate grooves in the saw defined by those teeth which are beveled in the opposite direction.

Figure 3:
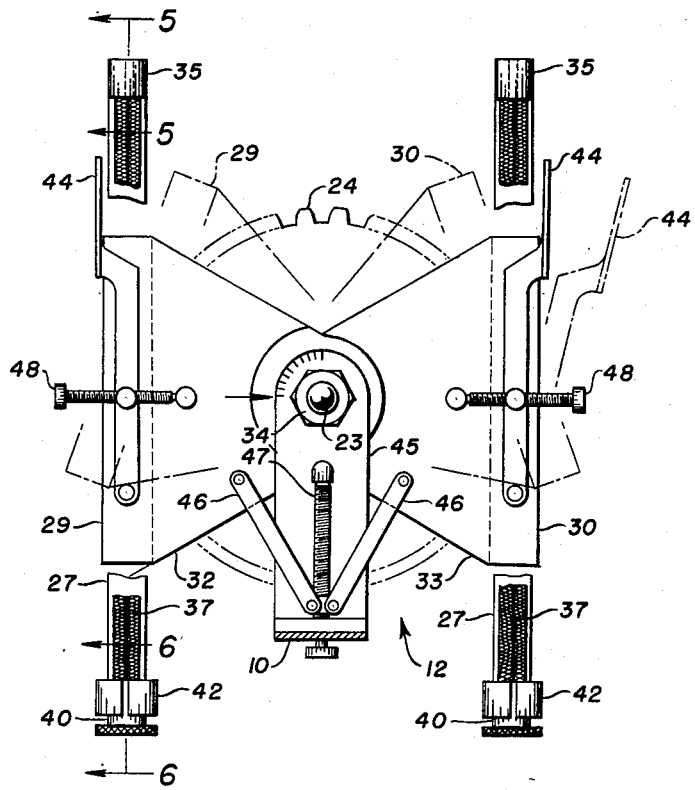
Figure 3 is a sectional bottom view of a portion of the sharpening device taken along the line 3—3 of Figure 2, and showing the manner in which the sharpening members may be adjusted to conform to the bevel of respective saw teeth.

With reference to Figure 3, the sharpening assembly 12 may be opened out from the work holder 11 on the hinge 13 to allow for adjustment of the sharpening members. The end portion of strap hinge 10 mounted on axle 23 is calibrated as shown in Fig. 3 and is linked to the supporting plates 32 and 33 by means of a flexible linkage 46. The flexible linkage 46 is in turn provided with an adjustable lead screw 47 which functions to control the relative positions of the supporting plates carrying the sharpening members 37. After loosening the stop nut 34, the supporting plates may be displaced an equal angular distance, as indicated by the dotted lines in Figure 3, by adjustment of the lead screw 47. The adjustment of the supporting plates 32 and 33 with respect to the work holder should be such that the files 37 contact the saw teeth at opposite angles corresponding, respectively, to the desired bevels of alternate teeth.

It should be noted that the arrangement of the drive mechanism is such that the sharpening members always travel in opposite directions and are at opposite maximum positions in their travel at the same time, thereby eliminating any possibility of interference between the sharpening members caused by their movement in intersecting planes.

After adjustment of the two sharpening racks to correspond to the desired bevels of the saw teeth and after adjustment of the individual sharpening members to correspond to the desired slope of the saw teeth, the sharpening assembly 12 is initially positioned at one end of the guide bar 15 with the members contacting adjacent grooves of the saw at the end of that portion of the saw within the extremes of the work holder. After each sharpening action, the assembly 12 is stepped along the guide bar 15 with the respective sharpening members being alternately positioned in successive grooves of the saw, each sharpening member contacting only those similar grooves of the saw defined by saw teeth having a bevel corresponding to the angular setting of the sharpening member. The sharpening members 37 are guided in their movement across the saw by means of identical guide members 44 mounted on the supporting plates 32 and 33 which are adapted to contact grooves in the saw adjacent the grooves being filed by the sharpening members.

The arrangement of the racks 27 and 28, which carry the sharpening members 37, is such that rotation of the drive gear 24 in either direction produces a movement of both sharpening members across the saw simultaneously. Since the cutting edges of alternate saw teeth are on opposite sides of the saw, in utilizing conventional three-cornered files as the actual abrasive members, it will be apparent that the sharpening action of the files should be unidirectional for each sharpening element and in opposite directions from each other. This is accomplished by setting the two sharpening members 37 initially at opposite maximum positions in their travel while the sharpening assembly 12 is held out of engagement with the saw by opening the assembly out from the work holder 11 on the hinge 10. Having set the members 37 in this position, the assembly 12 is again closed to bring the sharpening members into contact with selected teeth of the saw. By turning the drive handle 25 with the members in this position, it will be seen that one member will be drawn across the saw in contact with a saw tooth having a cutting edge on that side of the saw corresponding to the direction of motion of the member, while the other sharpening member will be drawn across the saw in the opposite direction in contact with a selected tooth having its cutting edge on the opposite side of the saw.

At the end of travel of the members, the sharpening assembly 12 is again opened away from the work holder 11 slightly to permit the return of the sharpening members to the starting position by a slight turn of the drive handle 25 in the opposite direction. The assembly is again closed into contact with the saw and the sharpening action repeated until a satisfactory edge has been ground on the two teeth being sharpened. The entire assembly 12 is stepped along the guide bar 15 with the members 37 positioned in contact with successive teeth of the saw and the sharpening operation repeated along the entire length of the saw.

Again with reference to Figure 3, it may be seen that the guide members 44 are each provided with an adjustable lead screw 48. This adjustment has been provided to compensate for the varying distances between teeth of different types of saws, and in order that the guides 44 may be positioned in the troughs of the teeth thereby allowing the sharpening members to operate along the full cutting faces of the teeth. A similar adjustment of the sharpening members 37 may be accomplished by means of the extension piece 13 positioned for easy adjustment by means of set screw 14.

While I have described above the principles of my invention in connection with specific apparatus, it is to be clearly understood that this description is made only by way of example and not as a limitation to the scope of my invention.

What is claimed is:

1. A manually operable saw sharpening device comprising a work clamp for receiving and securing a saw to be sharpened, a sharpening assembly mounted in hinged relationship to the work holder and adapted to be opened out from the work holder and to be moved along the length of said holder in a direction parallel to a saw secured in the holder for advancing the sharpening assembly to successive portions of the saw, said sharpening assembly comprising a centrally disposed axle member having a circular gear mounted thereon and including means for manually rotating said gear, and a pair of geared drive racks meshed in tangential relationship to said circular gear on either side thereof and adapted to be driven across the work holder upon rotation of said circular gear in alternate directions of rotation, each of said racks being independently adjustable around the geared circumference of said circular gear for varying the angle at which each rack is driven across the work holder in accordance with the angular bevel of the saw teeth to be sharpened, an abrasive sharpening member mounted on each of said racks and adjustable thereon for positioning its cutting surface to conform to the angular slope of the saw teeth to be sharpened, and an adjustable guide member positioned adjacent to each of the sharpening members for guiding the members into contact with a saw secured in said work holder.

2. A manually operable saw sharpening device comprising a work holder for receiving and securing a saw to be sharpened, a sharpening assembly mounted in hinged relationship to the work holder for movement into and out of engagement with a saw mounted in the holder and movable along the length of said holder in a direction parallel to the length of a saw secured in the holder for advancing the sharpening assembly to successive portions of the saw, said sharpening assembly comprising a centrally disposed axle member having a circular gear rotatably positioned thereon and a pair of geared racks meshed in tangential relationship to said circular gear on either side thereof, each rack being adapted to be driven across the work holder upon rotation of the circular gear in alternate directions of rotation, said racks being independently adjustable around the geared circumference of said circular gear for positioning the racks to be driven across the work holder at angles corresponding respectively to the bevels of alternate saw teeth, and an abrasive sharpening member mounted on each of said racks and adjustable thereon for positioning its cutting surface to conform to the angular slope of the saw teeth to be sharpened.

ANKER THOMASSEN.

References Cited in the file of this patent

UNITED STATES PATENTS

| Number | Name | Date |
|---|---|---|
| 189,534 | Walsh | Apr. 10, 1877 |
| 256,360 | Muncaster | Apr. 11, 1882 |
| 728,893 | Foley | May 26, 1903 |
| 924,134 | Blankenburg | June 8, 1909 |
| 1,376,634 | Penny | May 3, 1921 |
| 1,549,694 | Taylor | Aug. 11, 1925 |
| 1,828,150 | Meacham | Oct. 20, 1931 |
| 2,383,151 | Orskog | Aug. 21, 1945 |
| 2,434,691 | Fields | Jan. 20, 1948 |